US008567946B2

(12) United States Patent
Gupta et al.

(10) Patent No.: US 8,567,946 B2
(45) Date of Patent: Oct. 29, 2013

(54) METHODS OF FILLING A LIQUID-FILLED LENS MECHANISM

(75) Inventors: Amitava Gupta, Roanoke, VA (US); Karim Haroud, Chavannes-sur-Moudon (CH); Urban Schnell, Münchenbuchsee (CH)

(73) Assignee: Adlens Beacon, Inc., Iselin, NJ (US)

( * ) Notice: Subject to any disclaimer, the term of this patent is extended or adjusted under 35 U.S.C. 154(b) by 0 days.

(21) Appl. No.: 13/341,389

(22) Filed: Dec. 30, 2011

(65) Prior Publication Data

US 2012/0192991 A1  Aug. 2, 2012

Related U.S. Application Data

(63) Continuation of application No. 12/399,368, filed on Mar. 6, 2009, now Pat. No. 8,087,778, which is a continuation-in-part of application No. 12/370,938, filed on Feb. 13, 2009, now abandoned.

(51) Int. Cl.
*G02C 7/02* (2006.01)
*G02B 3/12* (2006.01)
*G02B 3/14* (2006.01)
*G02B 1/06* (2006.01)

(52) U.S. Cl.
USPC .................... 351/159.4; 359/665; 359/666

(58) Field of Classification Search
USPC .................... 359/665–667; 351/159.4
See application file for complete search history.

(56) References Cited

U.S. PATENT DOCUMENTS

| 2,576,581 | A | | 11/1951 | Edwards |
| 2,836,101 | A | | 5/1958 | De Swart |
| 2,976,766 | A | | 3/1961 | Bianchi |
| 3,598,479 | A | | 8/1971 | Wright |
| 3,614,215 | A | | 10/1971 | Mackta |
| 4,890,903 | A | | 1/1990 | Treisman et al. |
| 4,913,536 | A | | 4/1990 | Barnea |
| 4,940,973 | A | * | 7/1990 | Katz .......................... 345/110 |
| 5,080,476 | A | | 1/1992 | Monin |
| 5,138,494 | A | | 8/1992 | Kurtin |
| 5,182,585 | A | | 1/1993 | Stoner |
| 5,229,885 | A | | 7/1993 | Quaglia |
| 5,371,629 | A | | 12/1994 | Kurtin et al. |

(Continued)

FOREIGN PATENT DOCUMENTS

JP         05212732 A  *  8/1993
WO    WO 2008/063442 A1     5/2008

OTHER PUBLICATIONS

Borish, I.M., *Clinical Refraction, 3rd Edition*, Chapter 26 (pp. 1051-1113), The Professional Press, Inc., Chicago (1970), 65 pages.

(Continued)

*Primary Examiner* — Scott J Sugarman
(74) *Attorney, Agent, or Firm* — Sterne, Kessler, Goldstein & Fox P.L.L.C.

(57) ABSTRACT

Methods for filling an internal volume of a liquid filled lens mechanism with fluid are provided. In some embodiments, the methods include creating a vacuum within the internal volume, de-aerating the fluid, filling the vacuum in the internal volume with the de-aerated fluid, and sealing the internal volume. In some embodiments, the methods include elevating a temperature of the fluid prior to sealing the internal volume. In some embodiments, the internal volume is formed by a structure having at least one flexible component.

13 Claims, 6 Drawing Sheets

(56) References Cited

U.S. PATENT DOCUMENTS

| | | | |
|---|---|---|---|
| 5,440,357 A | 8/1995 | Quaglia | |
| 5,515,203 A | 5/1996 | Nye | |
| 5,563,528 A | 10/1996 | Diba et al. | |
| 5,574,598 A | 11/1996 | Koumura et al. | |
| 5,632,936 A * | 5/1997 | Su et al. | 264/2.5 |
| 5,636,368 A | 6/1997 | Harrison et al. | |
| 5,668,620 A | 9/1997 | Kurtin et al. | |
| 5,684,637 A | 11/1997 | Floyd | |
| 5,719,397 A | 2/1998 | Hallett et al. | |
| 5,731,909 A | 3/1998 | Schachar | |
| 5,739,959 A | 4/1998 | Quaglia | |
| 5,790,882 A | 8/1998 | Silver et al. | |
| 5,900,921 A | 5/1999 | Min | |
| 5,952,846 A | 9/1999 | Silver | |
| 5,956,183 A | 9/1999 | Epstein et al. | |
| 5,963,048 A | 10/1999 | Harrison et al. | |
| 5,973,852 A | 10/1999 | Task | |
| 5,999,328 A | 12/1999 | Kurtin et al. | |
| 6,040,947 A | 3/2000 | Kurtin et al. | |
| 6,053,610 A | 4/2000 | Kurtin et al. | |
| 6,069,742 A | 5/2000 | Silver | |
| 6,091,892 A | 7/2000 | Xue et al. | |
| 6,188,525 B1 | 2/2001 | Silver | |
| 6,246,528 B1 | 6/2001 | Schachar | |
| 6,288,846 B1 | 9/2001 | Stoner, Jr. | |
| 6,552,860 B1 | 4/2003 | Alden | |
| 6,618,208 B1 | 9/2003 | Silver | |
| 6,626,532 B1 | 9/2003 | Nishioka et al. | |
| 6,715,876 B2 | 4/2004 | Floyd | |
| 6,930,838 B2 | 8/2005 | Schachar | |
| 6,992,843 B2 | 1/2006 | Juhala | |
| 7,068,439 B2 | 6/2006 | Esch et al. | |
| 7,085,065 B2 | 8/2006 | Silver | |
| 7,142,369 B2 | 11/2006 | Wu et al. | |
| 7,256,943 B1 | 8/2007 | Kobrin et al. | |
| 7,324,287 B1 | 1/2008 | Gollier | |
| 7,325,922 B2 | 2/2008 | Spivey | |
| 7,338,159 B2 | 3/2008 | Spivey | |
| 7,369,321 B1 | 5/2008 | Ren et al. | |
| 7,382,544 B2 | 6/2008 | Cernasov | |
| 7,423,811 B2 | 9/2008 | Silver | |
| 7,440,193 B2 | 10/2008 | Gunasekaran et al. | |
| 7,453,646 B2 | 11/2008 | Lo | |
| 7,475,985 B2 | 1/2009 | Blum et al. | |
| 7,580,195 B2 | 8/2009 | Choi et al. | |
| 7,580,197 B2 | 8/2009 | Omura et al. | |
| 7,594,726 B2 | 9/2009 | Silver | |
| 7,604,349 B2 | 10/2009 | Blum et al. | |
| 8,018,658 B2 | 9/2011 | Lo | |
| 2004/0240076 A1 | 12/2004 | Silver | |
| 2006/0066808 A1 | 3/2006 | Blum et al. | |
| 2006/0077562 A1 | 4/2006 | Silver | |
| 2006/0164731 A1 | 7/2006 | Wu et al. | |
| 2006/0245071 A1 | 11/2006 | George et al. | |
| 2006/0250699 A1 | 11/2006 | Silver | |
| 2007/0030573 A1 | 2/2007 | Batchko et al. | |
| 2007/0211207 A1 | 9/2007 | Lo et al. | |
| 2008/0002150 A1 | 1/2008 | Blum et al. | |
| 2008/0007689 A1 | 1/2008 | Silver | |
| 2008/0008600 A1 | 1/2008 | Silver | |
| 2008/0019015 A1 | 1/2008 | Fernandez et al. | |
| 2008/0084532 A1 | 4/2008 | Kurtin | |
| 2008/0112059 A1 | 5/2008 | Choi et al. | |
| 2008/0218873 A1 | 9/2008 | Batchko et al. | |
| 2008/0231963 A1 | 9/2008 | Batchko et al. | |
| 2008/0285143 A1 | 11/2008 | Batchko et al. | |
| 2008/0316587 A1 | 12/2008 | Tijburg et al. | |
| 2009/0021843 A1 | 1/2009 | Obrebski et al. | |
| 2009/0052409 A1 | 2/2009 | Chen et al. | |
| 2009/0086331 A1 | 4/2009 | Gunasekaran et al. | |
| 2009/0128922 A1 | 5/2009 | Justis et al. | |
| 2009/0195882 A1 | 8/2009 | Bolle et al. | |
| 2009/0213471 A1 | 8/2009 | Silver et al. | |
| 2009/0251792 A1 | 10/2009 | Suzuki et al. | |
| 2010/0208194 A1 | 8/2010 | Gupta et al. | |

OTHER PUBLICATIONS

Jalie, M., *The Principles of Ophthalmic Lenses, 4th Edition*, Chapter 18 (pp. 413-468), The Association of Dispensing Opticians, Hazell Watson & Viney Limited, London (1984), 58 pages.

Markoff, J., "Scientists at Work: Stephen Kurtin—Making Eyeglasses That Let Wearers Change Focus on the Fly," *The New York Times*, 3 pages (Aug. 4, 2009).

Tang, S.K.Y. et al., "Dynamically Reconfigurable Liquid-Core Liquid-Cladding Lens in a Microfluidic Channel," *Lab on a Chip*, vol. 8, No. 3, p. 395-401 (Mar. 2008), 8 pages.

Gupta, A. et al., U.S. Appl. No. 12/579,203, filed Oct. 14, 2009, entitled "Aspheric Fluid Filled Lens Optic,".

Gupta, A. et al., U.S. Appl. No. 12/848,910, filed Aug. 2, 2010, entitled "Non-Round Fluid Filled Lens Optic,".

Gupta, A. et al., U.S. Appl. No. 12/855,465, filed Aug. 12, 2010, entitled "Fluid-Fillled Lenses and their Opthalmic Applications,".

Senatore, D. et al., U.S. Appl. No. 12/904,720, filed Oct. 14, 2010, entitled "Fluid Filled Lenses and Mechanisms of Inflation Thereof,".

Gupta, A. et al., U.S. Appl. No. 12/904,736, filed Oct. 14, 2010, entitled "Fluid Filled Lens Reservoir System and Manufacturing Method of the Reservoir System,".

Senatore, D. et al., U.S. Appl. No. 12/904,769, filed Oct. 14, 2010, entitled "Hinge Mechanism for a Fluid Filled Lens Assembly,".

Senatore, D. et al., U.S. Appl. No. 13/000,887, filed Dec. 22, 2010, entitled "Fluid Filled Lenses and Mechanisms of Inflation Thereof,".

* cited by examiner

METHODS OF FILLING A LIQUID-FILLED LENS MECHANISM

CROSS REFERENCE TO RELATED APPLICATION

This application is a continuation of U.S. patent application Ser. No. 12/399,368, filed on Mar. 6, 2009, now U.S. Pat. No. 8,087,778, which is a continuation-in-part of U.S. patent application Ser. No. 12/370,938, filed on Feb. 13, 2009, now abandoned.

FIELD OF THE INVENTION

The present invention relates to the field of variable focus lenses, and more particularly to consumer ophthalmic lenses that are at least in part fluid- or liquid-filled.

BACKGROUND OF THE INVENTION

It is known that the ability of the human eye to accommodate, i.e., to alter the focal length of the natural lens in the eye, is gradually diminished with increased age. Accommodation in human beings is reduced to 3D (diopters) or less at an age range of 35-45 years. At that point, reading glasses or some other form of near vision correction becomes necessary for the human eye to be able to bring near objects (such as lines of text in a book or a magazine) to focus. With, further aging, accommodation drops below 2D, and at that point visual correction when working on a computer or when performing some visual task at intermediate distances is needed.

For best results and for best visual comfort, it is necessary to bring each eye to focus on the same viewing target, e.g., a computer screen. A large segment of population requires a different visual correction for each eye. These people, known as anisometropes, require different visual correction for each eye in order to achieve maximum visual comfort while reading or working on a computer. It is known that, if each of the two eyes of anisometropes is not brought to focus at the same viewing plane, the resulting anisometropic image blur causes a loss of stereopsis (depth perception). Loss of stereopsis is one of the best indications of loss of binocular function. Loss of binocularity at the reading plane may cause a drop in reading speed and rate of comprehension, and may hasten the onset of fatigue upon sustained reading or working on a computer. Reading glasses fitted with individually adjustable liquid lenses are therefore uniquely suited for the visual need of individuals with loss of binocular function.

Variable focus lenses can take the form of a volume of liquid enclosed between flexible, transparent sheets. Typically, two such sheets, one forming the lens front surface and one fowling the lens back surface, are attached to one another at their edges, either directly or to a carrier between the sheets, to form a sealed chamber containing the fluid. Both sheets can be flexible, or one can be flexible and one rigid. Fluid can be introduced into or removed from the chamber to vary its volume, and, as the volume of liquid changes, so does the curvature of the sheet(s), and thus the power of the lens. Liquid lenses are, therefore, especially well suited for use in reading glasses, that is, eye glasses used by presbyopes for reading.

Variable focus liquid lenses have been known at least since 1958 (see, e.g., U.S. Pat. No. 2,836,101, to de Swart). More recent examples may be found in Tang et al, "Dynamically Reconfigurable Liquid Core Liquid Cladding Lens in a Microfluidic Channel", LAB ON A CHIP, Vol. 8; No. 3, pp. 395-401 (2008), and in International Patent Application Publication No. WO 2008/063442, entitled "Liquid Lenses with Polycyclic Alkanes". These liquid lenses are typically directed towards photonics, digital phone and camera technology, and microelectronics.

Liquid lenses have also been proposed for consumer ophthalmic applications. See for example, U.S. Pat. No. 5,684,637 and U.S. Pat. No. 6,715,876 to Floyd, and U.S. Pat. No. 7,085,065, to Silver. These references teach pumping of liquid in or out the lens chamber to change the curvature of an elastic membrane surface, thus tuning the focus of the liquid lens. For example, U.S. Pat. No. 7,085,065, entitled "Variable Focus Optical Apparatus", teaches a variable focus lens formed from a fluid envelope comprising two sheets, at least one of which is flexible. The flexible sheet is retained in place between two rings, which are directly secured together, such as by adhesive, ultrasonic welding or any similar process, and the other, rigid sheet may be directly secured to one of the rings. A hole is drilled through the assembled lens to allow the cavity between the flexible membrane and the rigid sheet to be filled with transparent fluid.

Liquid lenses have many advantages, including a wide dynamic range, the ability to provide adaptive correction, robustness and low cost. However, in all cases, the advantages of liquid lenses must be balanced against its disadvantages, such as limitations in aperture size, possibility of leakage and inconsistency in performance. In particular, Silver has disclosed several improvements and embodiments directed towards effective containment of the fluid in the liquid lens to be used in ophthalmic applications, although not limited to them (e.g., U.S. Pat. No. 6,618,208 to Silver, and references therein). Power adjustment in liquid lenses has been effected by injecting additional fluid into a lens cavity, by electrowetting, by application of ultrasonic impulse and by utilizing swelling forces in a cross linked polymer upon introduction of a swelling agent such as water.

Commercialization of liquid lenses is expected to occur in the near future, provided that some of the limitations noted above can be remedied. Even so, the structure of prior art liquid lenses is bulky and not aesthetically suitable for consumers, who desire spectacles having thinner lenses and spectacles without bulky frames. For the lenses that operate by injection or pumping of liquid into the body of the lens, a complicated control system is usually needed, making such lenses bulky, expensive and sensitive to vibration.

In addition, to date, none of the prior art liquid lenses provides the consumer with the ability to introduce the liquid into or remove it from the lens chamber so as to himself change its volume in order to vary the power of the lens. In addition, none of the prior art liquid lenses provides a mechanism to allow the consumer to introduce the liquid into or remove it from the lens chamber so as to himself change its volume in order to vary the power of the lens.

SUMMARY OF THE INVENTION

Methods for filling an internal volume of a liquid filled lens mechanism with fluid are provided. In some embodiments, the methods include creating a vacuum within the internal volume, de-aerating the fluid, filling the vacuum in the internal volume with the de-aerated fluid, and sealing the internal volume. In some embodiments, the methods include elevating a temperature of the fluid prior to sealing the internal volume. In some embodiments, the internal volume is formed by a structure having at least one flexible component.

The present invention will be better understood by reference to the following detailed discussion of specific embodiments and the attached figures, which illustrate and exemplify such embodiments.

BRIEF DESCRIPTION OF THE DRAWINGS

Embodiments of the invention will be understood and appreciated more fully from the following detailed description in conjunction with the figures, which are not to scale, in which like reference numerals indicate corresponding, analogous or similar elements, and in which:

FIG. 1A is a schematic cross-sectional view of a first embodiment of a liquid filled lens for use in spectacles or the like;

FIG. 1B is a schematic cross-sectional view of a second embodiment of a liquid filled lens for use in spectacles or the like;

DETAILED DESCRIPTION OF THE INVENTION

The following preferred embodiments as exemplified by the drawings are illustrative of the invention and are not intended to limit the invention as encompassed by the claims of this application.

Figure 1A:
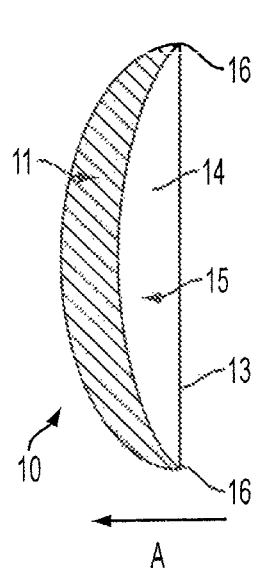

FIG. 1A shows a cross-sectional view of a first preferred embodiment of the optical apparatus, in the form of a variable focus lens 10, through which a wearer peers in the direction of arrow A. Lens 10 is a composite of two optic components, an anterior (i.e., front, with respect to the wearer) optic 11 that is substantially rigid and a posterior (i.e., back, with respect to the wearer) optic 15 that is a liquid.

Anterior optic 11 is a substantially rigid lens preferably made of a rigid, transparent substrate, such as a clear plastic or poly carbonate, glass plate, transparent crystal plate, or a transparent rigid polymer, for example, Polycarbonate of Bisphenol A or CR-39 (Diethylene glycol bisallyl carbonate). Anterior optic 11 may be made of an impact resistant polymer and may have a scratch resistant coating or an antireflective coating.

In a preferred embodiment, anterior optic 11 has a meniscus shape, i.e., convex at its front side and concave at its back side. Thus, both the front and the back surfaces of anterior optic 11 are curved in the same direction. However, as in all lenses that correct presbyopia (inability to accommodate), anterior optic 11 is thicker in the center and thinner at the edge, i.e., the radius of curvature of the front surface of anterior optic 11 is smaller than the radius of curvature of the back surface of anterior optic 11, such that the respective radii of curvature of the front and the back surfaces of anterior optic 11, and hence the front and the back surfaces themselves, intersect. The intersection of the front and the back surfaces of anterior optic 11 is the circumferential edge 16 of anterior optic 11.

In certain embodiments, the front surface of anterior optic 11 is spherical, meaning it has the same curve across its entire surface, as in conventional eyeglasses lenses. In a preferred embodiment, anterior optic 11 is aspheric and has a more complex front surface curvature that gradually changes from the center of the lens out to the edge, so as to provide a slimmer profile and a desired power profile as a function of the gaze angle, the gaze angle being defined herein as the angle formed between the actual line of sight and the principal axis of the lens.

Posterior optic 15 is a liquid lens composed of a fluid 14. Fluid 14 is confined within a cavity formed between the back surface of the anterior optic 11 and a membrane 13 that is attached to the edges of anterior optic 11. Membrane 13 is preferably made of a flexible, transparent, water impermeable material, such as clear and elastic polyolefins, polycycloaliphatics, polyethers, polyesters, polyimides and polyurethanes, for example, polyvinylidene chloride films, including commercially available films, such as those manufactured as Mylar® or Saran®. It has been found that a proprietary clear transparent film made of Polyethylene terephthalate is one preferred choice for the membrane.

The cavity between the back surface of the anterior optic 11 and a membrane 13 in FIG. 1A is formed by sealing membrane 13 to the periphery or circumferential edge 16 of the anterior optic 11. Membrane 13 may be sealed to anterior optic 11 by any known method, such as heat sealing, adhesive sealing or laser welding. Membrane 13 can be is at least in part bonded to a support element that is in turn bonded to the periphery of anterior optic 11. Membrane 13 is preferably flat when sealed but may be thermoformed to a specific curvature or spherical geometry.

Fluid 14 encapsulated between membrane 13 and the back surface of the anterior optic 11 is preferably colorless. However, fluid 14 can be tinted, depending on the application, such as if the intended application is for sunglasses. Fluid 14 having an appropriate index of refraction and viscosity suitable for use in fluid filled lenses, such as, for example, degassed water, mineral oil, glycerin and silicone products, among others that are commonly known or used for fluid filled lenses. One preferred fluid 14 is manufactured by Dow Corning® under the name 704 diffusion pump oil, also generally referred to as silicone oil.

In certain embodiments, membrane 13 by itself has no constraints in its optical properties. In other embodiments, membrane 13 has constraints in its optical properties, e.g., an index of refraction, that match the optical properties of fluid 14.

In use, at least one lens 10 is fit within a set of eyeglass or spectacle fumes for use by a wearer. As shown in FIG. 1A, in profile, lens 10 allows the user to see through both anterior optic 11 and posterior optic 15, which together provide a thicker profile at the center of lens 10, and stronger presbyopic visual correction, than just anterior optic 11. The wearer is provided with the ability to adjust the amount of fluid 14 within posterior optic 15 and thereby adjust the refractive power of lens 10. In certain embodiments, as will be discussed below, the frame is equipped with a reservoir of excess fluid 14 and a fluid line communicating the reservoir to the posterior optic 15 of lens 10. The spectacles frame also preferably has an adjustment mechanism to allow the wearer to personally adjust the amount of fluid 14 within posterior optic 15 so that fluid 14 that can be moved into or expelled from the reservoir into the posterior optic 15 to thereby adjust the refractive power of lens 10 as needed.

Figure 1B:
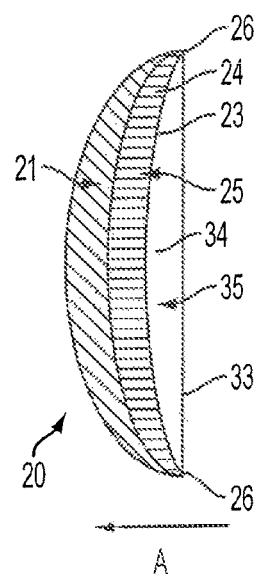

FIG. 1B shows a cross-sectional view of a second preferred embodiment of the optical apparatus, in the form of a variable focus lens 20, through which a wearer gazes in the direction of arrow A. As opposed to lens 10 in FIG. 1A, which is a composite of two optic components, lens 20 in FIG. 1B is a composite of three optic components, namely, an anterior optic 21 that is substantially rigid, an intermediate optic 25 that is a liquid and a posterior optic 35 that is a liquid.

Anterior optic 21 is a substantially rigid lens, similar in structure and design to that of anterior optic 11 of the embodiment shown in FIG. 1A. As in anterior optic 11 of FIG. 1A, anterior optic 21 also has a meniscus shape, i.e., both the front and the back surfaces of anterior optic 11 are curved in the same direction, and the radius of curvature of the front surface of anterior optic 21 is smaller than the radius of curvature of the back surface of anterior optic 21, such that the intersection of the front and the back surfaces of anterior optic 21 is the circumferential edge 26 of anterior optic 21. However, the radius of curvature of the back surface of anterior optic 21 is larger than the radius of curvature of the back surface of anterior optic 11 of FIG. 1A. Similarly, as compared to anterior optic 11 of FIG. 1A, anterior optic 21 may be somewhat thinner than anterior optic 11 of FIG. 1A, so as to maintain the same general overall thickness of lens 20 as compared to lens 10 of FIG. 1A.

Intermediate optic 25 is a liquid lens composed of a fluid 24, similar to fluid 13 as described with respect to FIG. 1A, that is confined within a cavity formed between the back surface of the anterior optic 21 and a membrane 23 that is attached to the edges 26 of anterior optic 21 and is similar in structure and design to that of membrane 13 of the embodiment shown in FIG. 1A. Fluid 24 has a selected refractive index ($n_{23}$).

It is preferred that intermediate optic 25 also have a meniscus shape, such that both its front and back surfaces are curved in the same direction. Naturally, the back surface of rigid anterior optic 21 may be formed with a curvature during manufacture. However, the concave curvature of membrane 23 may be accomplished by thermoforming it to a specific curvature or spherical geometry when it is being sealed to the edges 26 of anterior optic 21. This may be accomplished by a reducing the pressure within the sealed cavity formed between membrane 23 and the back surface of anterior optic 21. Thus, the radius of curvature of the back surface of anterior optic 21 is smaller than the radius of curvature of the membrane 23, and the intersection of the back surface of anterior optic 21 and membrane 23 is the circumferential edge 26 of anterior optic 21.

Posterior optic 35 is a liquid lens composed of a fluid 34, similar to fluid 13 as described with respect to FIG. 1A, that is confined within a cavity formed between membrane 23 and a membrane 33. Fluid 34 has a selected refractive index ($n_{34}$).

Membrane 33 has similar in structure and design to that of membrane 13 described regarding the embodiment shown in FIG. 1A. Membrane 33 may also be attached to the edges 26 of anterior optic 21 but posterior to, or over the edges of, the attached membrane 23. Alternatively, one or more rings, or half-rings, may be used to provide a seat for sealing membrane 23 and membrane 33.

Membrane 33 is preferably flat when sealed but may be thermoformed to a specific curvature or spherical geometry. In preferred embodiments, the positive pressure within intermediate optic 25 is lower than the positive pressure within posterior optic 35. The greater positive pressure within posterior optic 35 controls the shape of membrane 23 and the respective refractive powers of intermediate optic 25 within the cavity between the back surface of anterior optic 21 and membrane 23 and of posterior optic 35 within the cavity between membrane 23 and membrane 33.

In use, at least one lens 20 is fit within a set of eyeglass or spectacle frames designed for ophthalmic applications for use by a wearer. As shown in FIG. 1B, in profile, lens 20 allows the user to see through all of anterior optic 21, intermediate optic 25 and posterior optic 35, which together provide a thicker profile at the center of lens 20, and stronger presbyopic visual correction, than just anterior optic 21. In certain embodiments, the wearer is provided with the ability to adjust the amount of fluid 24 within intermediate optic 25 or the amount of fluid 34 within posterior optic 35, or within both, and thereby adjust the refractive power of lens 20. In certain embodiments, as will be discussed below, the frame is equipped with a reservoir of fluid 24 or a reservoir of fluid 34, or both, and a fluid line connecting the respective reservoir to the intermediate optic 25 or the posterior optic 35 of lens 20. The spectacles frame also preferably has one or more actuators or adjustment mechanisms to allow the wearer to personally adjust the amount of fluid 24 and fluid 34 within intermediate optic 25 and posterior optic 35, respectively, so that fluid 24 and fluid 34 that can be moved into or expelled from the respective reservoir into the intermediate optic 25 and the posterior optic 35, and thereby adjust the refractive power of lens 20 as needed.

Other embodiments of the optical apparatus having even more optical components are also possible. In addition to lens 10 in FIG. 1A, which is a composite of one rigid optic and one liquid optic, and lens 20 in FIG. 1B, which is a composite of one rigid optic and two liquid optics, the optical apparatus can also be a composite of one rigid optic and more than two liquid optics. Such embodiments, which are not shown here, may provide advantages to the user and may allow more refined and sophisticated ophthalmic adjustment than the embodiments described in FIGS. 1A and 1B.

Accordingly, in preferred embodiments, lens 10 or 20 may be used for applications in eyeglasses. Preferably, the lenses 10 or 20 for the left and the right eye are designed independently and are capable of adjustment of each eyeglass lens separately by the wearer. In such a case, it is preferred that a separate liquid reservoir be in fluid communication with each lens, i.e., connected to it by its own liquid line. In its most preferred embodiment, the liquid lens assembly, comprising the liquid lens, the reservoir and said liquid together constitute a sealed system, thus minimizing incursion of water or evaporation or leakage of the liquid. The fluid is driven by some force generated by a user when an adjustment in power is desired, and is thus be moved into or expelled from the respective reservoir into the fluid optic. The mechanism of adjustment of power of the liquid lens is by means of liquid transfer between the cavity and a reservoir.

Figure 2:
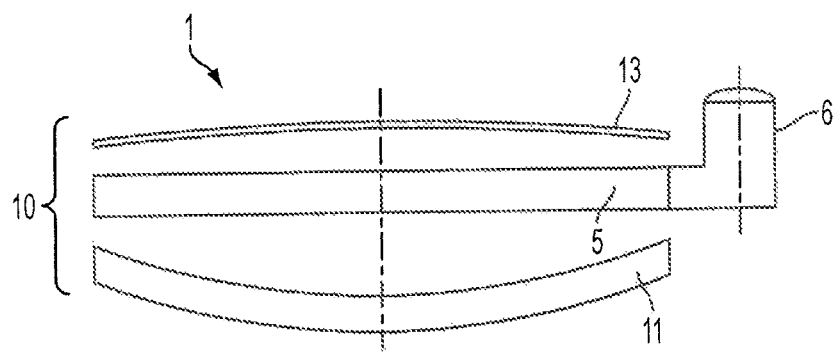
FIG. 2 is an exploded schematic cross-sectional view of an embodiment of the spectacles apparatus utilizing the liquid filled lens.

FIG. 2 shows an exploded schematic cross-sectional view of an embodiment of eyeglasses or spectacles 1 utilizing the liquid filled lens. Spectacles 1 has a frame or lens support 5, within which the variable focus lens is seated. For simplicity, FIG. 2 shows only one (the left) side of a set of spectacles having two eyeglasses, i.e., one for each eye. In addition, FIG. 2 shows a variable focus lens having only one fluid optic, e.g., as in lens 10 of FIG. 1A. For simplicity, various embodiments of the spectacles are described herein with respect to the embodiment of lens 10 having one fluid optic. Anterior optic 1 and membrane 13 are seen in the exploded view of FIG. 2, and one reservoir 6, which in fluid communication with the cavity formed between anterior optic 1 and membrane 13, is shown.

Figure 3A:
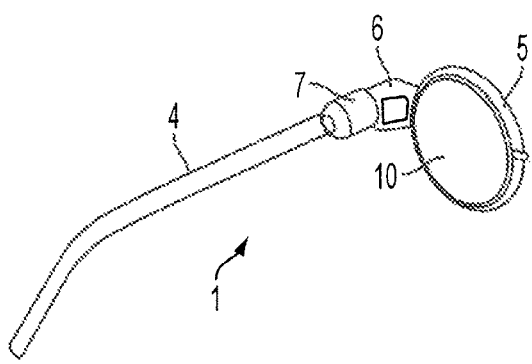
FIGS. 3A and 3B show back and front perspective views of one half of an embodiment of the spectacles apparatus utilizing the liquid filled lens.
Figure 3B:
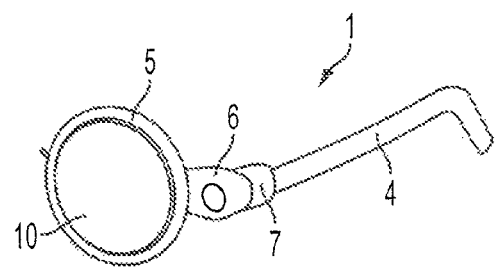

Similarly, FIGS. 3A and 3B show back and front perspective views of the left eyeglass portion of an embodiment of the spectacles apparatus 1 design for ophthalmic application utilizing the liquid filled lens. The eyeglass portion in FIGS. 3A and 3B consists of a frame 5 for supporting lens 10 and a temple piece 4. If the right eyeglass of the user also requires ophthalmic adjustment, then the right eyeglass would be substantially a mirror image of the left side. The lenses 10 or 20 for the left and the right eye are designed independently, since the point of attachment of the liquid lenses to the reservoir(s) may be mirror images to each other.

Anterior optic 11 and membrane 13 are seen in the exploded view of FIG. 2, and one reservoir 6, which in fluid communication with the cavity formed between anterior optic 1 and membrane 13, is shown. As shown in greater detail in FIGS. 3A, 3B, 4A and 4B, the components of liquid filled lens 10, namely anterior optic 11 and membrane 13, as well as ring 8 in which they are mounted, are shown. Reservoir 6, situated in some embodiments attached to or in frame 5, has a hollow cavity containing extra fluid 14 that can be injected into lens 10 through the fluid communication channel. The extra fluid 14 within reservoir 6 preferably does not completely fill reservoir 6 so as to allow additional fluid 14 from lens 10 to be drawn into reservoir 6.

Figure 4A:
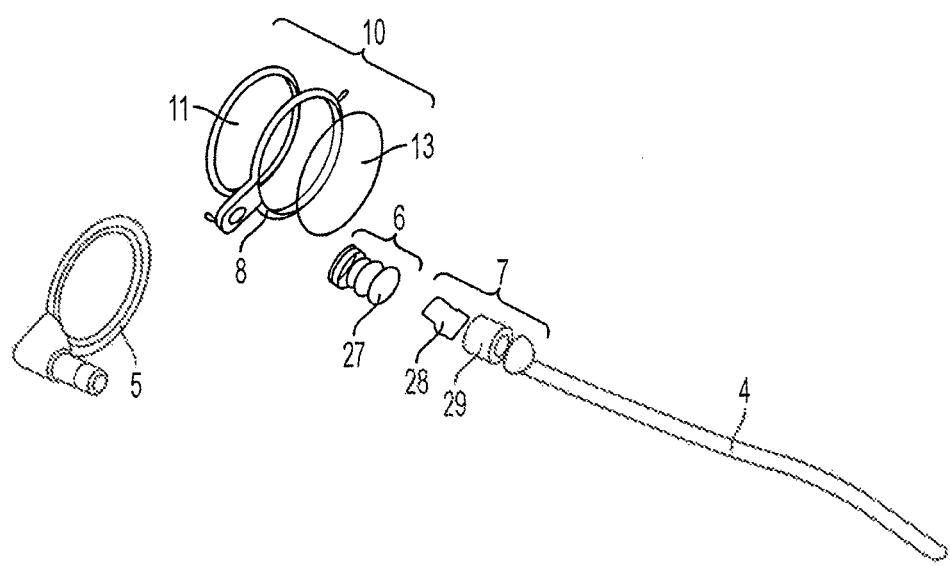
FIG. 4A is an exploded perspective view of the components of an embodiment of the spectacles apparatus utilizing the variable focus lens mechanism before introduction of fluid into the mechanism.
Figure 4B:
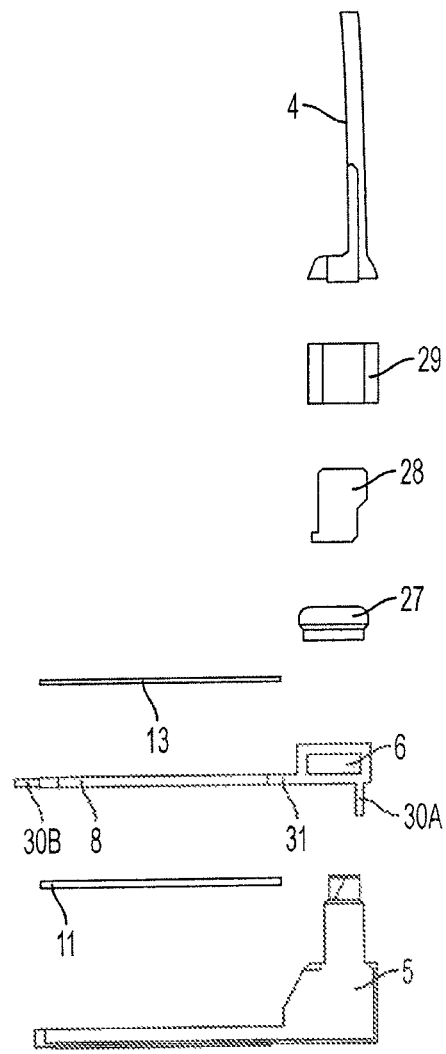
FIG. 4B is an exploded cross-sectional view of the components of an embodiment of the spectacles apparatus utilizing the variable focus lens mechanism before introduction of fluid into the mechanism.

As shown in FIGS. 3A and 3B, reservoir 6 has a mechanism or actuator 7 to inject fluid 14 into or draw fluid 14 out of the liquid lens optic 15. In one embodiment, reservoir 6 is made of a rigid material, and is fitted with a piston that is mechanically coupled to an adjustment mechanism or actuator 7, such as a thumb wheel, a barrel, a clamp or a lever, that may be attached to the lens holder frame 5 or to the eyeglasses temple piece 4. In the embodiment wherein actuator 7 is a barrel that is situated coaxially with the temple piece 4, as shown in FIGS. 4A and 4B, fluid may be forced out of reservoir 6, through the fluid channel and into lens 10 by turning the barrel actuator 7. In certain embodiments, once the optical power of lens 10 is adjusted by the actuator 7, the actuator 7 may be altered or disabled to prevent further adjustment of the optical properties of lens 10 by the wearer.

FIGS. 4A and 4B are exploded perspective and cross-sectional views that show in greater detail the components of the left eyeglass and frame of an embodiment of the spectacles assembly utilizing the variable focus lens mechanism, before introduction of fluid into the mechanism. Lens 10 is formed, as shown in FIG. 1A, by anterior optic 11 and membrane 13, and posterior optic 15 of lens 10 is in fluid communication with reservoir 6, which is shown as a hollow well that can retain fluid 14.

Reservoir 6 is in fluid communication with the cavity of lens 10, i.e., posterior optic 15, and injects fluid 14 into posterior optic 15 through a fluid channel 31, which may be any tube or passageway that connects reservoir 6 to the cavity of lens 10. Such a fluid channel 31 may be a short tube that extends the shortest possible distance from reservoir 6 to posterior optic 15. However, due to the viscosity of fluid 14, a fluid channel having only one entry point into posterior optic 15 is likely to restrict the flow of fluid 14 from reservoir 6 to posterior optic 15 and thus the time to effect the desired ophthalmic change. Even if such a fluid channel 31 were sufficiently wide such that fluid 14 flows sufficiently quickly, having one only entry point into posterior optic 15 might not enable fluid 14 to be evenly distributed within posterior optic 15 sufficiently quickly so as to effect the desired ophthalmic change with the desired speed.

In one preferred embodiment, fluid channel 31 has more than one point of injection of fluid 14 into posterior optic 15. In one embodiment, the fluid channel 31 that provides the fluid communication between reservoir 6 and posterior optic 15 may be in the form of a hollow ring 8, as previously described. The ring 8 may define a fluid channel, in the form of a hollow space inside ring 8. In one embodiment, ring 8, which may be set within the lens support or frame 5, as shown in. FIG. 4B, may be provided with a series of radial holes or openings arranged along the inside surface of ring 8 and through which the liquid is injected into posterior lens 15. The radial holes are preferably spaced at regular intervals, or more preferably at the most optimal distances from one another so as to deliver fluid 15 at a controlled rate. In certain embodiments, ring 8 does not extend completely around lens 10, but only, for example, around the top portion of lens 10. This may be done for stylistic reasons, e.g., so as not to require the user to wear a heavy-looking frame. In such an embodiment, the radial holes are arranged along the inside surface of that portion of ring 8 so as to inject fluid 14 into lens 10 from its top edge only.

As shown in FIG. 4B, ring 8 may be in fluid communication with reservoir 6 by means of a short liquid communication channel 31. In some embodiments, wherein spectacles 1 have more than one liquid optic, such as in lens 20 of FIG. 1B, each liquid lens cavity could be provided with a unique reservoir 6, each in fluid communication with a respective cavity of lens 20. Each liquid lens cavity could also be provided with a unique ring 8, so that the liquid channels remain separate for each cavity.

In addition to providing a fluid communication to posterior optic 15, ring 8, as the seat of the sealed flexible membrane, performs the additional function of providing a platform of defined width and tilt to which membrane 13 is bonded. In one embodiment, the surface of ring 8 is ellipsoidal in order to provide a stable planar seat for sealing onto anterior optic 11 on one side and flexible membrane 13 on the other. In such an embodiment, in order to avoid leakage of fluid 14 from lens 10, ring 8 must be sealed to anterior optic 11 and to flexible membrane 13. The process of sealing ring 8 to anterior optic 11 and to flexible membrane 13 may involve use of an adhesive such as an epoxy adhesive or may involve a welding process, including a laser welding process. One preferred method of laser welding sealing involves utilizing a laser absorbing dye solution that is applied to the interface to effect preferential absorption of laser energy at the interface. The preferred width of laser welding is between 0.5 and 2.0 mm, more preferably 1.0 mm.

In one embodiment of spectacles 1, the diameter of lens 10 is about 39 mm. However, because the edge of lens 10 may be utilized to form a bond between anterior optic 11 and membrane 13 or between the lens assembly 10 and frame 5, the optically clear area will generally be somewhat less, e.g., about 35 mm. The ring 8 is 2.0 mm in outer diameter, and 1.0 mm in inner diameter. The inner surface of the ring 8, i.e., facing the cavity, is provided with openings, e.g., 1 mm in diameter, disposed radially.

As shown in FIG. 4B, reservoir 6 is preferably covered and sealed with a flexible thermoplastic membrane 27. Membrane 27 may be made of Mylar®, a polyimide or a thermoplastic elastomer (TPE), preferably TPE. Membrane 27 may be the same material as membrane 13. However, in certain embodiments, membrane 27 is preferably not the same material as membrane 13, as membrane 27 need not be transparent.

In one embodiment, membrane 27 may be injection molded or thermoformed to fill the space inside reservoir 6. Membrane 27 may be joined or bonded to the inner surface of reservoir 6, such that membrane 27 bulges out over the top of reservoir 6, like a cushion or a balloon, in the manner of a diaphragm. The details of this subassembly are more clearly shown in FIGS. 5A and 5B. In another embodiment, membrane 27 may be joined or bonded or form-fitted over the outer edges of reservoir 6.

Membrane 27 forms an air-tight and fluid-tight seal on reservoir 6. In certain embodiments, membrane 27 projects upwards to form a bubble over the top of reservoir 6. Typically, the total internal volume of all of reservoir 6, liquid communication channel 31, ring 8 and posterior optic 15 of lens 10 together forms a single sealed space, substantially filled with fluid at all times. As the outward-bulging portion of membrane 27 is pushed inward into reservoir 6, the volume within reservoir 6 is decreased, such that membrane 27 creates positive pressure in reservoir 6, pushing fluid 14 out of reservoir 6, through liquid communication channel 31 and ring 8, and into posterior optic 15 of lens 10. Similarly, as the outward-bulging portion of membrane 27 is pulled outward from reservoir 6, the volume within reservoir 6 is increased, such that membrane 27 creates negative pressure in reservoir 6, pulling fluid 14 into reservoir 6, through liquid communication channel 31 and ring 8, from posterior optic 15 of lens 10.

Membrane 27 can be pushed downwards into reservoir 6 or pulled upwards away from reservoir 6 by any known means using an actuator 7. By such motion of membrane 27, fluid 14 is thereby expelled from reservoir 6 or pulled into reservoir 6. Since change of the amount of fluid within reservoir 6 will also change the amount of fluid 14 within lens 10, the optical properties of lens 10 can be changed.

In the embodiment shown in FIGS. 4A and 4B, actuator 7 has a plunger 28 situated immediately outside, and impinging against, membrane 27 and a movement device that provides movement to plunger 28. Movement of plunger 28 in a direction towards membrane 27 increases pressure onto membrane 27 and within reservoir 6, and movement of plunger 28 in a direction away from membrane 27 decreases pressure on membrane 27 and within reservoir 6. Plunger 28 is movable in opposing directions substantially transverse to membrane 27, and plunger 28 exerts pressure onto reservoir 6 by motion relative to membrane 27 due to a force or impulse exerted on a movement device. The movement device can be any device, such as a screw, lever, slide mechanism, etc., that provides controlled, adjustable and incremental movement to plunger 28.

In the embodiment shown in FIG. 4B, the movement device of actuator 7 is in the form of a barrel screw 29, which is threaded coaxially with temple piece 4 on frame 5 and coaxially with plunger 28 so as to provide movement to plunger 28 in directions toward and away from membrane 27. The actuation of the movement device of actuator 7, namely the rotation of barrel screw 29 along its threads, in a first direction, moves plunger 28 inwards towards membrane 27, pushing membrane 27 inwards into reservoir 6 and creating positive pressure inside reservoir 6. This positive pressure in reservoir 6 squeezes liquid 14 out of reservoir 6, through liquid communication channel 31 and ring 8, and into lens 10. In certain embodiments, plunger 28 forces membrane 27 so far back inside reservoir 6 such that membrane 27 nearly touches the bottom of reservoir 6.

Conversely, the actuation of the movement device of actuator 7, namely the rotation of barrel screw 29 along its threads, in a direction opposite to the first direction, moves plunger 28 away from membrane 27, allowing membrane 27 to move outwards from reservoir 6 and creating negative pressure inside reservoir 6. This negative pressure in reservoir 6 pulls liquid 14 into reservoir 6, through liquid communication channel 31 and ring 8, from lens 10. By rotation of barrel screw 29 in a first direction or in a direction opposite to the first direction, fluid 14 can be expelled from reservoir 6 into lens 10 or can be sucked into reservoir 6 from lens 10, to thereby change the optical properties of lens 10.

Liquid transfer between reservoir 6 and the fluid filled cavity, i.e., posterior optic 15 of lens 10, occurs through application of a force by means of the actuator 7. There is no universal need to prevent backflow of the fluid 14 from the cavity to the reservoir 6 since the whole fluid compartment comprising the cavity 15, the reservoir 6 and the channel 31/ring 8 is sealed and in communication with one another equalizing the pressure within. However, there may be a need to apply a unidirectional power correction for certain optical or visual needs. In such as case, actuator 7 may be made unidirectional, i.e., it only functions to move plunger 28 in one direction, either to force liquid 14 into lens 10 or to pull liquid 14 out of lens 10. In such an embodiment, gears (not shown) may be employed to prevent actuator 7 from reversing its action. Actuator 7 is typically adjusted manually as the wearer's need for additional ophthalmic power emerges. Alternatively, actuator 7 may be automatically adjusted by application of an electrical, magnetic, acoustic or thermal force, triggered in response to signal from a sensor that recognizes the need for additional power and sends a signal to that effect.

Figure 5A:
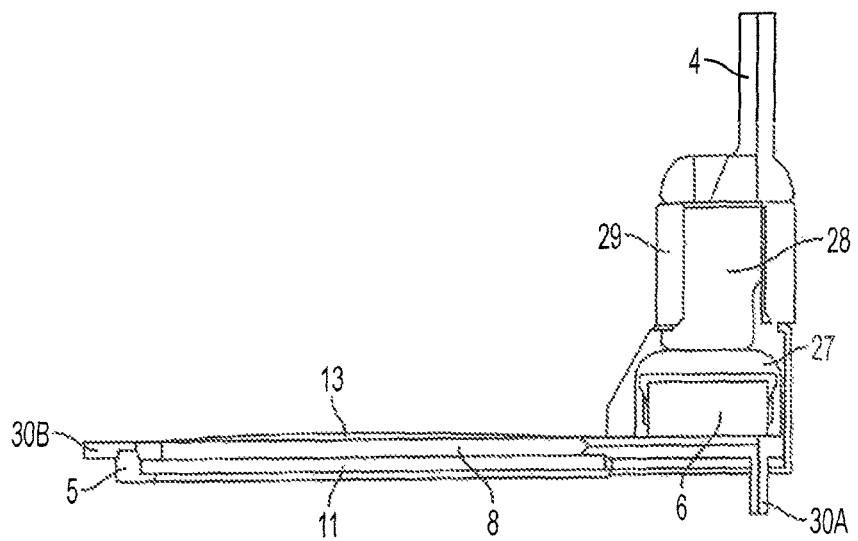
FIG. 5A is a cross-sectional view of an embodiment of the variable focus lens mechanism within the spectacles apparatus before introduction of fluid into the mechanism.
Figure 5B:
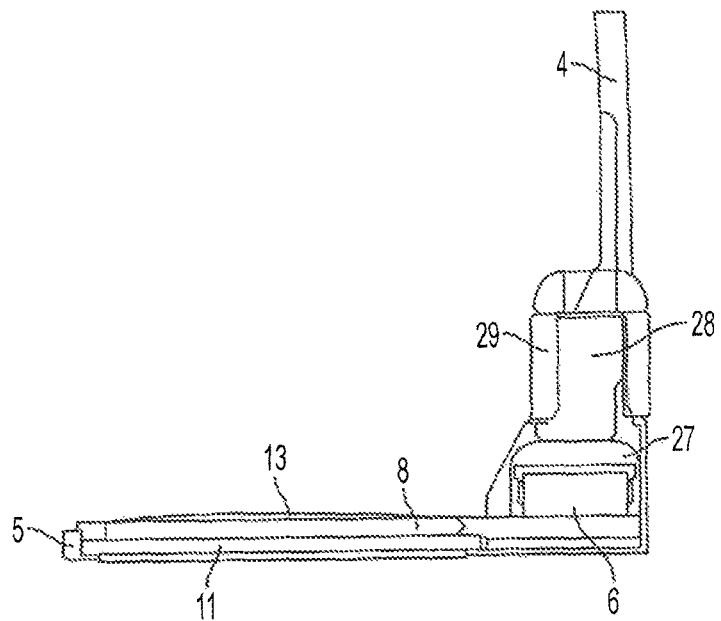
FIG. 5B is a cross-sectional view of an embodiment of the variable focus lens mechanism within the spectacles apparatus after introduction of fluid into the mechanism.

The sealed internal volume of the single sealed space consisting of reservoir 6, liquid communication channel 31, ring 8 and posterior optic 15 of lens 10 must be filled prior to operation of spectacles 1. In one embodiment, the internal volume is initially filled before sealing of spectacles 1 by injecting fluid 14 at an elevated temperature (preferred range 45-90° C., preferably 65-80° C.). Filling of the internal volume may be done through one or more inlets, such as inlet 30A below reservoir 6 or inlet 30B at the remote edge of ring 8, or both, as shown in FIGS. 4B and 5A. Filling of the internal volume is preferably done under vacuum, using freshly de-aerated fluid, so that a minimum of air is included within the sealed internal volume. In fact, it is preferred that no air, i.e., a vacuum, be within the sealed internal volume such that operation of actuator 7 will move only fluid 14 into and out of lens 10. Once the spectacles assembly 1 is sealed, inlets 30A and 30B may be sealed off or removed, leaving no outlet for fluid 14 or air at the locations of inlets 30A and 30B. FIG. 5A shows the spectacles assembly before introduction of fluid into the mechanism, with inlets 30A and 30B intact, and FIG. 5B shows spectacles assembly after filling with fluid and sealing, with inlets 30A and 30B sealed off.

The optical and mechanical design of the liquid lens enables its main function, namely to provide capability to adjust optical power over as broad a range as possible without significantly impacting cosmetic appearance, durability or optical performance. A goal of the design is to minimize the volume of the liquid lens 10, preferably by reducing its thickness. The thickness of the liquid lens depends on the curve of the back surface of the anterior optic 11 and the diameter of the lens system. The dimensions of the liquid lens was designed using an Finite Element Model (FEM) that accepts as input the surface geometry of the back surface of the anterior optic 11, the required adjustable power range, and the thickness of the fluid 14 layer when the membrane 13 is flat.

For example, in one embodiment, a liquid lens system covering the range of powers from 1.25 D to 3.25 D consists of the anterior optic 11 that is of zero spherical power. The preferred range of the radius of curvature of the anterior optic 11 is between 100 to 700 mm depending on the refractive index of the material used to fabricate anterior optic 11, more preferably between 500 and 600 mm. The preferred range of thickness of anterior optic 11 is 0.7 to 2.5 mm, more preferably between 1.0 and 1.5 mm, and most preferably about 1.3 mm. It is well known that spherical aberration that affects the effective power provided by an optic away from its center, depends on the angle of gaze and the power at the center. For an optic of 30-40 mm in diameter (that controls the maximum gaze angle) and for a paraxial power range of 1.0 D to 5.0 D, the off axis deviation in power is expected to be about 0.25-0.50 D.

The preferred embodiment of lens 10 (anterior optic 11 and posterior optic 15) has a power equal to 1.21 D at the center, the liquid layer of posterior optic 15 having a thickness of ranging from 0.7 to 1.5 mm at the center, preferably 1.3 mm. The diameter of lens 10 is 35 mm, while the radius of curvature of membrane 13 is infinity, since membrane 13 is bonded flat. The total volume of fluid in the liquid lens is approximately 1.35 mL, while an additional volume of 0.350 mL resides in the reservoir.

The power of lens 10 increases when the pressure of liquid 14 in posterior optic 15 is increased by injecting more liquid 14 into the cavity from reservoir 6. The radius of curvature of membrane 13 is 274 mm when the lens power reaches 3.25 D. 300 microliters (0.30 mL) of fluid 14 is required to reach the level of positive pressure required to cause the required level of deformation (bulging) of membrane 13.

Figure 6A:
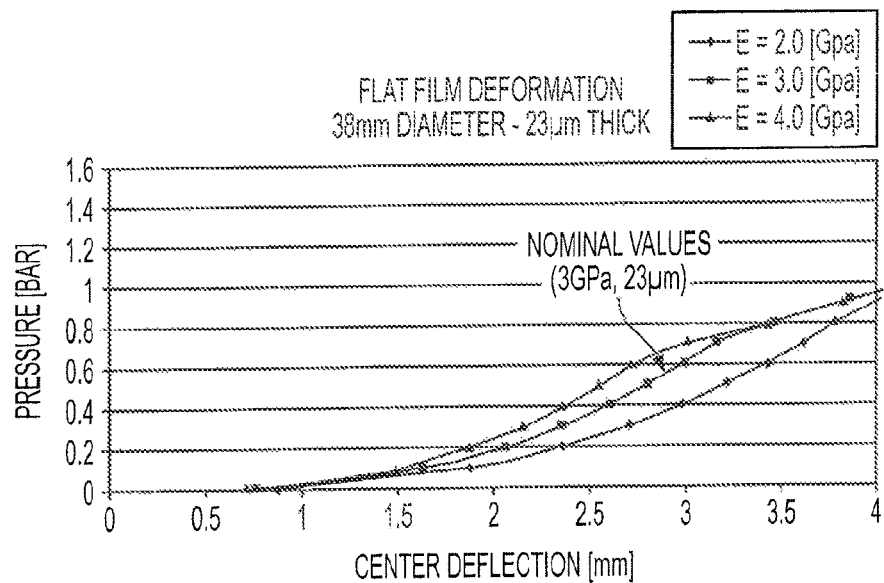
FIGS. 6A and 6B are graphical software analyses of the performance of the liquid filled lens.
Figure 6B:
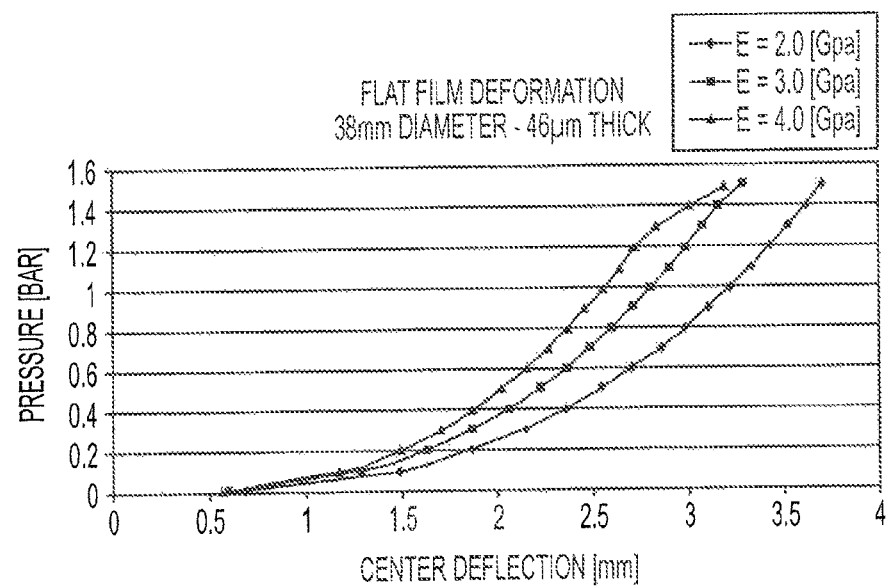

A mechanical finite element model (FEM) model was developed to predict the pressure required to increase the power of the whole lens and the resulting displacement of membrane 13. The model was created for two thicknesses of membrane 13, 23 and 46 microns (1 and 2 mil), and for three different values of tensile modulus of the membrane 13, namely 2.0 GPa, 3.0 GPa and 4.0 GPa. FIGS. 6A and 6B show output from the FEM model showing pressure build up as a result of fluid injection into the liquid lens of the three preferred configurations.

FIGS. 6A and 6B show that membrane 13 undergoes elastic deformation leading to displacement of its center outwards as fluid is pumped in and pressure increases. It is clear that 2.0 D of power enhancement can be achieved well within the elastic range of deformation of this material. In fact, since the increase in power is approximately linear with the displacement of the center of the membrane at this range, the FEM model predicts that less than 1 mm of center displacement will lead to a 4 D of power increase in the 38 mm optic, while the elastic limit is reached only when the displacement reaches 3 mm. Moreover, the shape of the deformed membrane remains reasonably spherical over the whole of the elastic range.

A well known deficiency of liquid lenses or compound lenses incorporating a liquid lens component is that the fluid volume required for a particular increase in power increases dramatically with optic diameter. This phenomenon has limited the application of liquid lenses to optics of small apertures only, thus preventing its widespread use in ophthalmic lens applications. This is borne out by the prediction made by the FEM model (FIG. 7A), showing that there is a doubling of the volume of fluid required to increase optical power by 2.0 D of a baseline power of 1.21 D if the optic diameter increases from 32 mm to 38 mm. However, the volume is reduced by a factor of 2 as the radius of the front optic is increased from 260 mm to 500 mm. We have used the FEM model to obtain the optimum curvature of the front curve of the rigid optic for the optic diameter required for a particular frame.

Figure 7A:
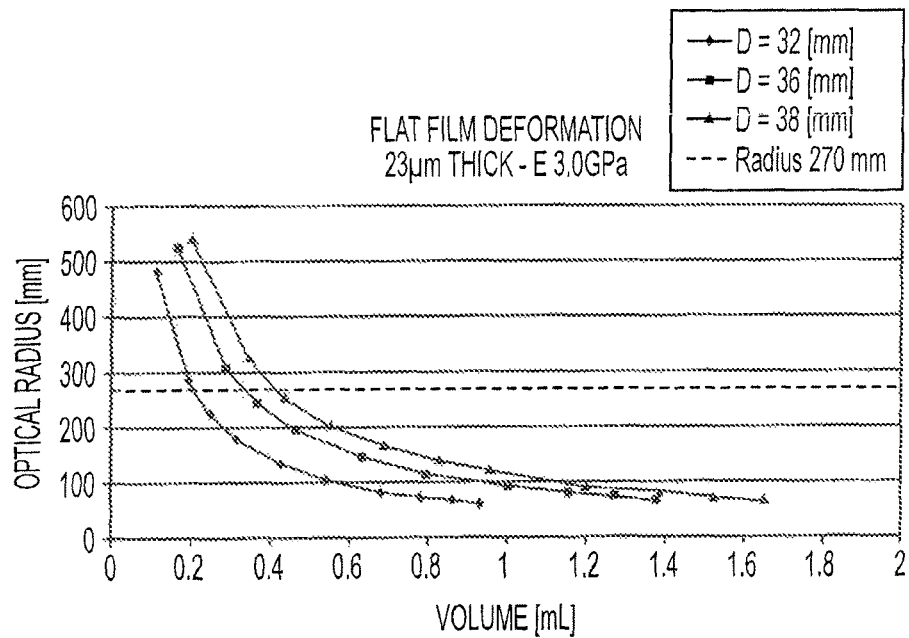
FIGS. 7A and 7B are graphical software analyses of the performance of the liquid filled lens.
Figure 7B:
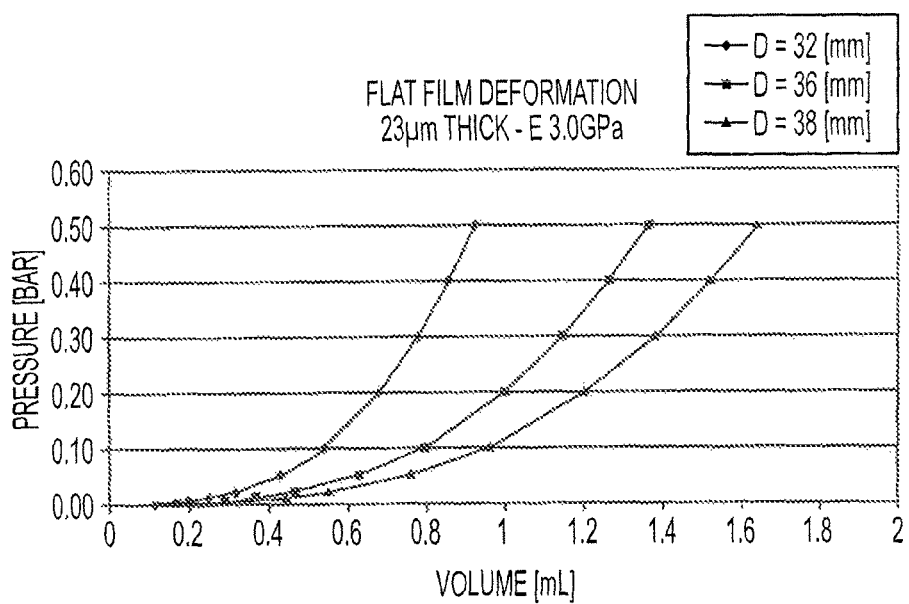

It is also necessary for membrane 13 to be under a minimum positive pressure in order to ensure a stable optical performance of a liquid lens. This positive pressure prevents development of wrinkles and prevents gravity-induced pooling of liquid 14 at the bottom of the cavity to affect the optical power. An FEM model was used to estimate the minimum amount of positive pressure needed for stable operation even when optical power is not enhanced through injection of additional fluid from the reservoir. FIGS. 7A and 7B show the results of the FEM model, showing the increase in fluid volume required in order to achieve a particular increase in power: dependence on optic diameter and front curve radius in the preferred embodiment.

We determined through tests that the minimum pressure required to prevent wrinkles is about 3 millibar (mbar) for a 38 mm optic covered with a 23 micron thick Mylar membrane with a modulus of 3 GPa. Modeling of the gravitationally induced pooling effects showed that about 2 mbar of positive pressure will counteract the gravitational force. In addition, temperature variations will also alter the positive pressure built into the liquid lens, and will affect the optical performance of the liquid lens. Based on these considerations, including model predictions and test results, it was decided that a positive pressure of 10 mbar will be sufficient to ensure the membrane to remain stretched over all use conditions. This amount of positive pressure can be induced by reducing the baseline power below the required range of power variations, or also by changing the thickness of the membrane. It was determined that a membrane of thickness 200 microns and modulus 3 GPa will require a positive pressure of approximately 10 mbar for an optic diameter of 38 mm in order to maintain a power increase of 0.25 D. The enhanced thickness of the flexible membrane enhances its durability and robustness, without adding significantly to the overall lens thickness.

Thus, a mechanism for operating a liquid filled lens has been provided. One skilled in the art will appreciate that the present invention can be practiced by other than the described embodiments, which are presented for purposes of illustration and not limitation, and that the invention is limited only by the claims that follow.

What is claimed is:

1. A method of filling an internal volume of a liquid filled lens mechanism with fluid, the method comprising:
   creating a vacuum within the internal volume of the lens mechanism, the internal volume including an internal portion of a liquid filled lens and a reservoir;
   de-aerating the fluid;
   filling the vacuum in the internal volume with the de-aerated fluid; and
   sealing the internal volume.

2. The method of claim 1, wherein de-aerating the fluid occurs before creating a vacuum within the internal volume.

3. The method of claim 1, further comprising:
   elevating a temperature of the fluid prior to sealing the internal volume.

4. The method of claim 3, wherein elevating the temperature of the fluid comprises elevating the temperature of the fluid to a range from about 45° C. to about 90° C.

5. The method of claim 3, wherein elevating the temperature of the fluid comprises elevating the temperature of the fluid to a range from about 65° C. to about 80° C.

6. The method of claim 3, wherein de-aerating the fluid occurs before elevating the temperature of the fluid.

7. The method of claim 3, wherein de-aerating the fluid occurs at the same time as elevating the temperature of the fluid.

8. The method of claim 1, wherein the fluid is silicone oil.

9. The method of claim 1, wherein the internal volume is formed by a structure having at least one flexible component.

10. The method of claim 1, wherein filling the vacuum in the internal volume comprises filling the internal volume with fluid through an inlet in the liquid filled lens mechanism.

11. The method of claim 10, wherein sealing the internal volume comprises sealing off the inlet after filling the internal volume.

12. The method of claim 10, wherein sealing the internal volume comprises removing the inlet after filling the internal volume.

13. The method of claim 1, wherein filling the vacuum in the internal volume comprises filling the internal volume with fluid through a plurality of inlets in the liquid filled lens mechanism.

* * * * *

UNITED STATES PATENT AND TRADEMARK OFFICE
CERTIFICATE OF CORRECTION

| | |
|---|---|
| PATENT NO. | : 8,567,946 B2 |
| APPLICATION NO. | : 13/341389 |
| DATED | : October 29, 2013 |
| INVENTOR(S) | : Gupta et al. |

Page 1 of 1

It is certified that error appears in the above-identified patent and that said Letters Patent is hereby corrected as shown below:

In the Specification

Column 1, line 52, replace "one fowling the lens back surface" with --one forming the lens back surface--.

Signed and Sealed this
Eighteenth Day of March, 2014

Michelle K. Lee
*Deputy Director of the United States Patent and Trademark Office*